(12) United States Patent
Lejnell et al.

(10) Patent No.: US 12,470,286 B2
(45) Date of Patent: Nov. 11, 2025

(54) DUAL-BAND RADIO TERMINAL AND FILTER STRUCTURE

(71) Applicant: OVZON SWEDEN AB, Solna (SE)

(72) Inventors: Kennet Lejnell, Ekerö (SE); Anders Ellgardt, Sundbyberg (SE); Fredrik Wester, Älvsjö (SE); Fredrik Holmberg, Uppsala (SE)

(73) Assignee: OVZON SWEDEN AB, Solna (SE)

( * ) Notice: Subject to any disclaimer, the term of this patent is extended or adjusted under 35 U.S.C. 154(b) by 295 days.

(21) Appl. No.: 18/271,504

(22) PCT Filed: Jan. 29, 2021

(86) PCT No.: PCT/EP2021/052189
§ 371 (c)(1),
(2) Date: Jul. 10, 2023

(87) PCT Pub. No.: WO2022/161630
PCT Pub. Date: Aug. 4, 2022

(65) Prior Publication Data
US 2024/0313852 A1    Sep. 19, 2024

(51) Int. Cl.
*H04B 7/185* (2006.01)
(52) U.S. Cl.
CPC .............................. *H04B 7/18513* (2013.01)
(58) Field of Classification Search
CPC .................................................. H04B 7/18513
See application file for complete search history.

(56) References Cited

U.S. PATENT DOCUMENTS

| 4,396,896 A | 8/1983 | Williams |
| 5,162,808 A | 11/1992 | Kim |
| (Continued) | | |

FOREIGN PATENT DOCUMENTS

| CN | 203871473 U | 10/2014 |
| CN | 108288764 A | 7/2018 |
| (Continued) | | |

OTHER PUBLICATIONS

Ovzon Sweden AB, International Patent Application No. PCT/EP2021/052189, International Search Report, Oct. 19, 2021.
(Continued)

*Primary Examiner* — Raymond S Dean
(74) *Attorney, Agent, or Firm* — Moore & Van Allen PLLC; W. Kevin Ransom (57) ABSTRACT

A filter structure has a frame carrying a filter compartment that holds first and second waveguide filters ($F_{1H}$, $F_{2H}$; $F_{1L}$, $F_{2L}$). The filter compartment is rotatable a predetermined angle around a rotation axis (AV) relative to the frame so as to either engage the first waveguide filter ($F_{1H}$, $F_{2H}$) or the second waveguide filter ($F_{1L}$, $F_{2L}$) in a waveguide conduit, thus rendering the waveguide conduit adapted for forwarding radio-frequency signals at a higher band or a lower band respectively. Consequently, the filter structure is suitable for inclusion in a dual-band radio terminal for communication with spacecrafts via an antenna unit exchanging radio-frequency signals bidirectionally with the spacecrafts.

12 Claims, 5 Drawing Sheets

(56) References Cited

U.S. PATENT DOCUMENTS

| | | | |
|---|---|---|---|
| 5,373,546 A | 12/1994 | Holzermer | |
| 6,201,949 B1 | 3/2001 | Kich et al. | |
| 2011/0069644 A1 | 3/2011 | Kim et al. | |
| 2012/0075041 A1* | 3/2012 | Flynn | H01P 1/207 333/230 |
| 2014/0266514 A1* | 9/2014 | Rogozine | H01P 1/2002 333/212 |
| 2016/0191148 A1* | 6/2016 | Harrington | H04B 7/18595 370/316 |
| 2017/0215011 A1* | 7/2017 | Goldstein | H04R 25/305 |
| 2021/0092036 A1* | 3/2021 | Jain | H04L 65/80 |
| 2021/0231865 A1* | 7/2021 | Nezhad | G02B 26/0808 |

FOREIGN PATENT DOCUMENTS

| | | |
|---|---|---|
| EP | 1344275 A1 | 9/2003 |
| EP | 2835860 A1 | 2/2015 |
| EP | 3075095 A1 | 10/2016 |
| EP | 3561946 A1 | 10/2019 |
| GB | 2061018 A | 5/1981 |
| WO | 0250939 A1 | 6/2002 |
| WO | 2015080769 A1 | 6/2015 |

OTHER PUBLICATIONS

Ovzon Sweden AB, International Patent Application No. PCT/EP2021/052189, Written Opinion, Oct. 19, 2021.

Ovzon Sweden AB, Swedish Patent Application No. 2150108-5, Search Report, Sep. 28, 2021.

Ovzon Sweden AB, International Patent Application No. PCT/EP2021/052189, International Preliminary Report on Patentability, Jul. 31, 2023.

\* cited by examiner

# DUAL-BAND RADIO TERMINAL AND FILTER STRUCTURE

CROSS-REFERENCE TO RELATED APPLICATIONS

This application is a National Stage Patent Application (filed under 35 § U.S.C. 371) of PCT/EP2021/052189, filed Jan. 29, 2021, of the same title; the contents of which are hereby incorporated by reference.

TECHNICAL FIELD

The invention relates generally to satellite terminal design. In particular, the present invention concerns a terminal for dualband radio communication with spacecrafts. The invention also relates to a filter structure for engaging selectively either a first waveguide filter or a second waveguide filter in a waveguide conduit, thus rendering the waveguide conduit adapted for forwarding radio-frequency signals at a higher band or a lower band respectively.

BACKGROUND

Typically, a satellite terminal for dual band operation is designed such that the user must swap certain key components when switching between the frequency bands. The specific components necessary to swap varies between different designs and ranges from filters, amplifier circuitry, receiver circuitry and even the antennas, if a common antenna cannot be made wideband enough.

In other words, basically half the terminal may need to be swapped in connection with changing bands. This is inconvenient and time consuming, and may lead to malfunction and/or loss of vital pieces of equipment. Moreover, if the terminal is mobile, the user must carry around a number of interchangeable components. The overall terminal kit therefore becomes relatively voluminous.

CN 108288764 shows a Ku/Ka switching dual-band feeder network and various forms of antennas in wireless microwave satellite communications or antennas in electronic reconnaissance signals. The design, which includes a Ku/Ka-band switching microwave network, a Ku-band polarization rotating mechanism, two Ka-band filters and a fixed platform thereby avoids the need for swapping components when switching between the Ku and Ka bands. However, the design is comparatively inefficient with respect to the volume occupied.

EP 1344275 discloses a device for filtering electromagnetic waves, which device includes a cylindrical element containing waveguide filters that are centered on an axis. Here, different pairs of transmitter/receiver filters are selected by rotating the cylindrical element, which contacts the source antenna and the transmission/reception block of the transmitter/receiver device.

Although the above designs overcome some of the problems outlined initially, none of these prior-art designs is compact enough to provide a truly volume-efficient solution, which is suitable for integration into a mobile terminal.

SUMMARY

One object of the present invention is therefore to offer on improved dual-filter structure and a terminal design, which enables a minimized overall size while avoiding any additional components.

According to one aspect of the invention, the object is achieved by a terminal for dual-band radio communication with spacecrafts. The terminal contains: an antenna unit, first and second amplifying and frequency-mixing circuitries and a modulator-demodulator unit. The antenna unit is configured to exchange radio-frequency signals bidirectionally with the spacecrafts. The first amplifying and frequency-mixing circuitry is configured to up convert an outgoing modulated signal to be fed through a first waveguide conduit connected to the antenna unit. The second amplifying and frequency-mixing circuitry is configured to down convert an incoming signal received through a second waveguide conduit connected to the antenna unit. The modulator-demodulator unit is configured to transform an outgoing baseband signal into the outgoing modulated signal and transform an incoming modulated signal down converted from the incoming signal into a received baseband signal. Each of the first and second waveguide conduits is arranged to forward radio-frequency signals on at least two separate bands. Specifically, the first and second waveguide conduits contain a respective or a common filter compartment that is rotatable a predetermined angle around a rotation axis relative to a frame so as to either engage a first waveguide filter pair or a second waveguide filter pair in the first and second waveguide conduits. Here, the first waveguide filter pair is adapted for radio communication at a higher band than the second waveguide filter pair.

This terminal is advantageous because it enables a low-profile/flat design, which is suitable to be arranged along a flat surface, such as an antenna array, and thus attains a highly volume-efficient solution.

According to embodiments of this aspect of the invention, the filter compartment is rotatable 180 or 90 degrees around the rotation axis relative to the frame. The rotation axis, in turn, may either be perpendicular or parallel to a flat surface onto which the frame is mounted.

Rotation 180 degrees around the rotation axis is advantageous, since it allows a very compact design, especially if the rotation axis is perpendicular to the flat surface. Namely, in such a case the first and second waveguide filters may be arranged side by side with a respective lowest side protruding from the flat surface.

Rotation 90 degrees around the rotation axis is advantageous, since it requires less movement when switching bands. Further, if the rotation axis is perpendicular to the flat surface, the 90 degrees rotation embodiment accomplishes a maximal distance between the engaged and non-engaged waveguide filters, which, in turn, vouches for small signal leakage.

According to yet another embodiment of this aspect of the invention, the filter compartment is configured to be manually rotated by a user of the terminal. Hence, the design becomes robust, cost-efficient and light-weight.

According to still another embodiment of this aspect of the invention, alternatively or additionally, the terminal contains an electric motor, or other kind of automatically controllable actuator device, which is configured to cause filter compartment to rotate in response to a control signal. Thereby, the terminal may switch frequency bands without involving the user, and even by remote control.

According to another embodiment of this aspect of the invention, the terminal contains a sensor arrangement configured to produce a signal indicating which of the first and second waveguide filter pairs that is engaged in the first and second waveguide conduits. Preferably, the sensor arrangement is further configured to indicate if the one of the first or the second waveguide filter pairs being engaged in the first and second waveguide conduits is properly positioned therein. Consequently, proper and reliable operation of the terminal can be ensured.

According to another aspect of the invention, the object is achieved by a filter structure for engaging selectively either a first waveguide filter or a second waveguide filter in a waveguide conduit, thus rendering the waveguide conduit adapted for forwarding radio-frequency signals at a higher band or a lower band respectively. The filter structure contains a frame carrying a filter compartment that, in turn, holds the first and second waveguide filters. The filter compartment is rotatable a predetermined angle around a rotation axis relative to the frame so as to either engage the first waveguide filter or the second waveguide filter in the waveguide conduit. Hence, a low-profile/flat design is enabled, which is suitable for volume-efficient arrangement along a flat surface, such as an antenna array.

According to one embodiment of this aspect of the invention, the filter structure contains at least one leakage reduction component, which is configured to reduce an outflow of signal energy outside of the first or second waveguide filter respectively being engaged in the waveguide conduit. Thereby, the user may conveniently and efficiently switch between the two frequency bands and maintain a high signal quality at each of said bands when transmitting as well as receiving signals.

According to other embodiments of this aspect of the invention, the at least one leakage reduction is represented by: at least 10 one waveguide choke configured to screen off electromagnetic energy from an input to or an output from the filter structure; at least one stub element arranged in an outer wall of the filter compartment, which at least one stub element is configured to prevent leaking electromagnetic energy from propagating along said outer wall; and/or at least one spring-assisted contact member arranged in a bearing ring of the filter compartment, which at least one contact member is configured to cause galvanic contact between the filter compartment and the frame thus shortcutting any leaking electromagnetic energy. Hence, com-20 pact and efficient leakage reduction is attained.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
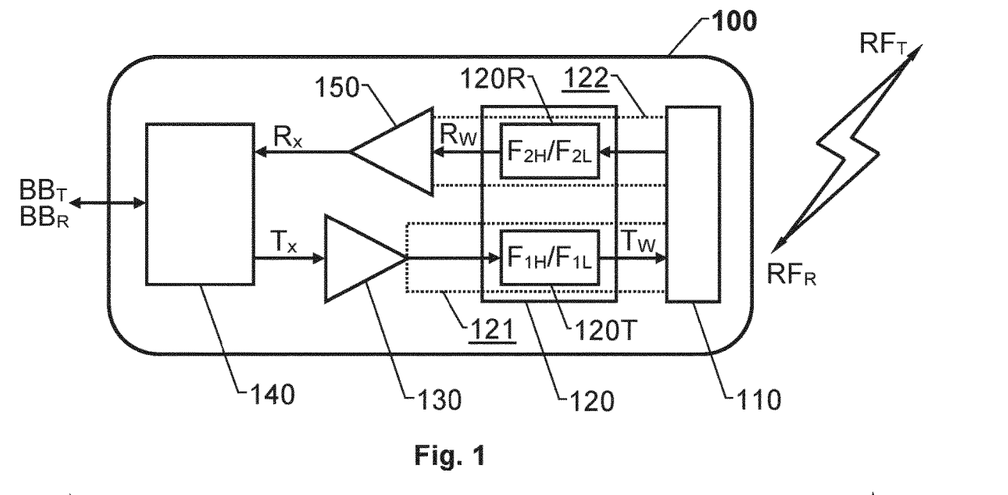
FIG. 1 shows a block diagram of a terminal according to one embodiment of the invention.

FIG. 1 shows a block diagram of a terminal 100 for dual-band radio communication with spacecrafts according to one embodiment of the invention. The terminal 100 contains an antenna unit 110, a first amplifying and frequency-mixing circuitry 130, a second amplifying and frequency-mixing circuitry 150 and a modulator-demodulator unit 140.

The antenna unit 110 is configured to exchange radio-frequency signals RFR and RFT respectively in a bidirectional manner with the spacecrafts, for example on the AP30B Ku and the Standard Ku bands. The AP30B Ku band uses the following terminal frequencies for reception: 10.7-10.95 GHZ and 11.2-11.45 GHZ, and for transmission 12.75-13.25 GHz. The Standard Ku band uses the following terminal frequencies for reception: 10.95-11.2 GHz and 11.45-12.75 GHZ, and for transmission 13.75-14.5 GHz.

The first amplifying and frequency-mixing circuitry 130 is configured to up convert an outgoing modulated signal $T_X$ to be fed through a first waveguide conduit 121 connected to the antenna unit 110 in the form of a signal for transmission $T_W$.

The second amplifying and frequency-mixing circuitry 150 is configured to down convert an incoming signal $R_W$ received through a second waveguide conduit 122 connected to the antenna unit 110. The incoming signal $R_W$ is down converted into an incoming modulated signal $R_X$.

According to embodiments of the invention, either or both of the a first and second waveguide conduits 121 and/or 122 may be implemented by means of transmission lines, e.g. a microstrip, stripline or coaxial cable.

The modulator-demodulator unit 140 is configured to transform an outgoing baseband signal $BB_T$ into the outgoing modulated signal $T_X$, and transform the incoming modulated signal $R_X$ into a received baseband signal $BB_R$.

Each of the first and second waveguide conduits 121 and 122 respectively is arranged to forward radio-frequency signals on at least two separate bands, which in FIG. 1 are denoted $F_{1H}/F_{1L}$ and $F_{2H}/F_{2L}$ respectively.

The first and second waveguide conduits 121 and 122 either contain a respective filter compartment, or a common filter compartment holding waveguide filters for the separate bands $F_{1H}/F_{1L}$ and $F_{2H}/F_{2L}$, as will be exemplified below with reference to FIG. 9. In FIG. 1, a first filter compartment for the transmitter filters $F_{1H}$ and $F_{1L}$ is denoted 120T, and a second filter compartment for the receiver filters $F_{2H}$ and $F_{2L}$ is denoted 120R.

As will be described below with reference to FIGS. 3 to 6, the filter compartment(s) 120T and 120R is(are) rotatable a predetermined angle around a rotation axis relative to a frame so as to either engage a first waveguide filter pair $F_{1H}$ and $F_{2H}$ respectively or a second waveguide filter pair $F_{1L}$ and $F_{2L}$ respectively in the first and second waveguide conduits 121 and 122 respectively. Here, the first waveguide filter pair $F_{1H}$ and $F_{2H}$ is adapted for a relatively high frequency band, and the second waveguide filter pair $F_{1L}$ and $F_{2L}$ is adapted for a relatively low frequency band. Of course, according to the invention, the opposite relationship is equally well conceivable.

Figure 2A:
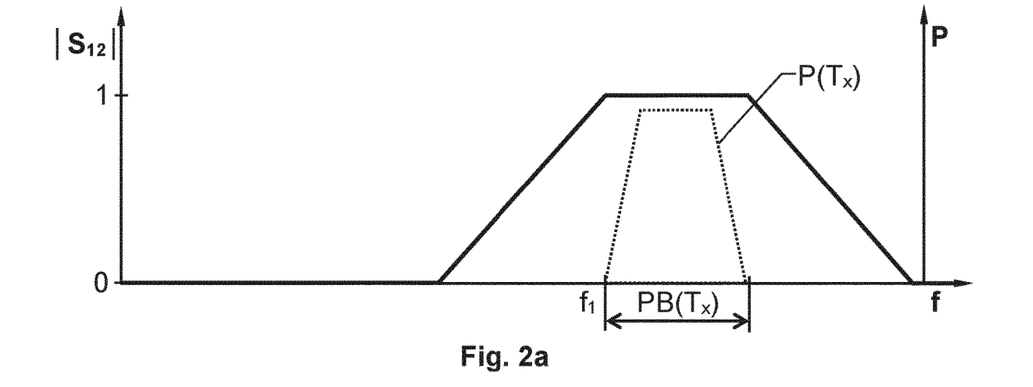
FIGS. 2a, b show frequency graphs illustrating a general concept according to the invention, wherein signals are transmitted and received via a common antenna unit.
Figure 2B:
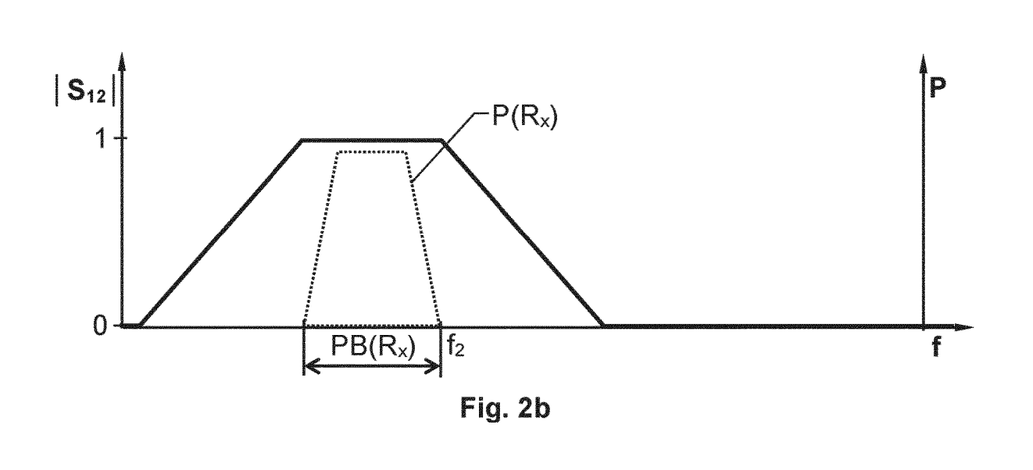

FIGS. 2a and 2b show frequency graphs illustrating a general concept according to the invention, wherein signals are transmitted and received via a common antenna unit 110.

FIG. 2a shows a graph representing a symbolic signal gain|$S_{12}$| in a linear scale from 0 to 1 along the vertical axis and frequency along the horizontal axis. A right-hand side vertical axis designates spectral signal energy P. The graph in FIG. 2a depicts a first frequency response for a first waveguide filter, say $F_{1H}$, of the transmitter filter 120T having a transmitter passband PB($T_X$) extending from a first frequency $f_1$ and up. The transmitter passband PB($T_X$) is adapted to let a transmitted signal through with a first spectrum P($T_X$). Below first frequency $f_1$, the transmitter filter 120T is configured to discriminate/block any transmitted noise energy from the first amplifying and frequency-mixing circuitry 130. Thus, the transmitter filter 120T prevents increase of a noise level of the second amplifying and frequency-mixing circuitry 150 in a receiver passband PB($R_X$) extending up to a second frequency $f_2$ being lower than the first frequency $f_1$.

FIG. 2b shows a graph representing a symbolic signal gain|$S_{12}$| in a linear scale from 0 to 1 along the vertical axis and frequency along the horizontal axis. Analogous to FIG. 2a, a right-hand side vertical axis also designates spectral signal energy P. The graph in FIG. 2b depicts a second frequency response for a second waveguide filter, say $F_{2L}$, of the receiver filter 120R having the receiver passband PB($R_X$) extending up to the second frequency $f_2$. This means that, above the second frequency $f_2$, the receiver filter 120R is configured to discriminate/block any noise energy received from the antenna unit 110 and the signal transmitted from the antenna unit 110. Consequently, Thus, the receiver filter 120R prevents increase of a noise level of the first amplifying and frequency-mixing circuitry 130 in the transmitter passband PB($T_X$), which may be reflected back into the antenna unit 110.

In general, filters are designed to let through/transfer signals in frequency bands, so-called passbands, and discriminate/block against signals in so-called stop bands. In between said pass and stop bands, the filter response continuously changes from the passband to the stop band. The steepness of the change is called the filter's roll off. To improve the roll off of the filter design, the designer needs to add poles of the filter. As a result, a steeper filter generally needs to be larger in size and often have higher losses in the pass band of the filter. To guarantee that adequate performance is achieved by the transmitter and receiver filters 120T and 120R respectively, a guard band is used in between the transmitter passband PB($T_X$) and the receiver passband PB($R_X$). The guard band allows the filters' roll offs to be located outside of the frequency ranges of the transmitter and receiver passbands PB($T_X$) and PB($R_X$) respectively. Thereby, the transmitter and receiver filters 120T and 120R may function as described above.

The invention allows the terminal 100 to include transmitter and receiver circuitry 130 and 150 to be operable in a larger set of frequency bands than what is possible with a terminal employing traditional filtering. According to the invention, the transmitter passband PB($T_X$) of the first waveguide conduit 121 may overlap, or be spectrally very close to the receiver passband PB($R_X$) of the second waveguide conduit 122.

Furthermore, the terminal 100 is configured to enable a change between a first waveguide filter pair $F_{1H}/F_{2H}$ and a second waveguide filter pair $F_{1L}/F_{2L}$ in the first and second waveguide conduits 121 and 122 respectively. Thereby, an arbitrary transmitter passband PB($T_X$) may be used in the transmitter passband PB($T_X$) or an arbitrary receiver passband PB($R_X$) in the receiver passband PB($R_X$). However, the combination of filter pairs $F_{1H}/F_{2H}$ and $F_{1L}/F_{2L}$ must fulfill the requirement that filters pass bands and stop bands coincide with frequencies used as explained above.

Figure 3:
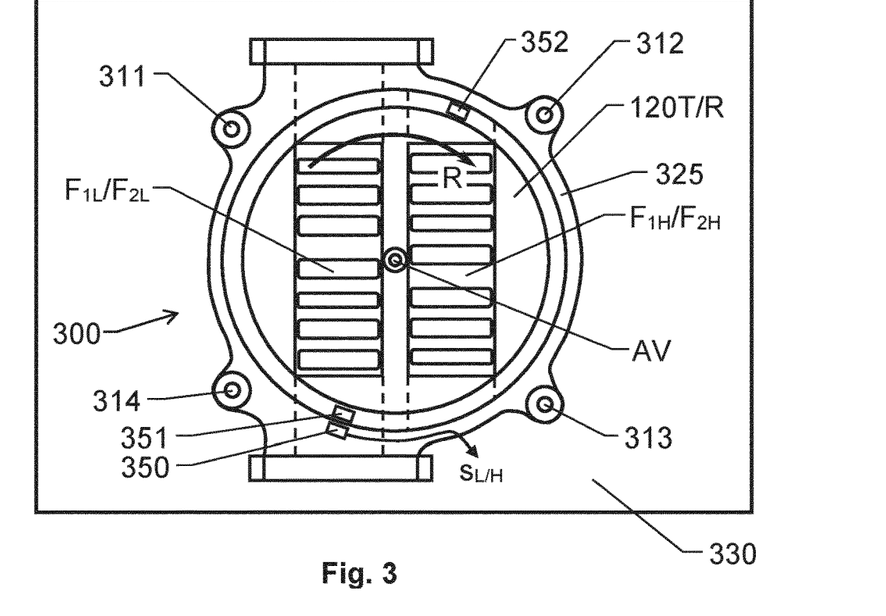
FIG. 3 illustrates a filter structure according to a first embodiment of the invention.

In FIG. 3, we see a filter structure 300 according to a first embodiment of the invention. Here, a first waveguide filter $F_{1H}$ is implemented to the right in a cylindrical filter compartment 120R and a second waveguide filter $F_{1L}$ is implemented to the left in the filter compartment 120R. The filter compartment 120R is rotatable R a predetermined angle, here 180 degrees, around a rotation axis AV relative to a frame 325 so as to either engage the first waveguide filter $F_{1H}$ or the second waveguide filter $F_{1L}$ in one of the first or second waveguide conduits, say 121. FIG. 3 shows a positioning of the filter structure 300 where the second waveguide filter $F_{1L}$ is engaged in the first waveguide conduit 121.

According to the invention, the analogous is true for the second waveguide conduit 122. This means that a separate filter structure 300 may be devised for the second waveguide conduit 122, where a filter compartment 120R is rotatable 180 degrees around the rotation axis AV relative to the frame 325 so as to either engage a first waveguide filter $F_{2H}$ or a second waveguide filter $F_{2L}$ in one of the second waveguide conduit 122.

Alternatively, the filter compartments 120T and 120R may be combined, i.e. be implemented parallel to one another, so that when such a combined filter compartment 120T/R is rotated 180 degrees a particular filter pair $F_{1H}$ and $F_{1L}$ or $F_{2H}$ and $F_{2L}$ is simultaneously engaged in the first and second waveguide conduits 121 and 122 respectively. For example, the first waveguide filter pair $F_{1H}$, $F_{2H}$ may be adapted for radio communication at a higher band than the second waveguide filter pair $F_{1L}$, $F_{2L}$. FIG. 9 shows one example of such an implementation.

In the embodiment shown in FIG. 3, the rotation axis AV is perpendicular to a flat surface 330 onto which the frame 325 is mounted via attachments means, e.g. screws, schematically illustrated as 311, 312, 313 and 314 in FIG. 3.

According to embodiments of the invention, the filter compartment 120T/R may be configured to be manually rotated R by a user of the terminal 100, be rotated by means of an electric motor (not shown), or both. Naturally, the electric motor may alternatively be represented by any other type of automatically controllable actuator device, e.g. a microelectromechanical actuator, such as a comb drive, a hydraulic piston, a relay, a thermal biomorph, a digital micromirror device, a piezoelectric actuator, an electroactive polymer or a servo mechanism.

According to one embodiment of the invention, the filter structure 300 contains a sensor arrangement configured to produce a signal $S_{L/H}$ indicating which of the first and second waveguide filter pairs $F_{1H}$, $F_{2H}$ or $F_{1L}$, $F_{2L}$ respectively that is engaged in the first and second waveguide conduits 121 and 122. FIG. 3 represents such a sensor arrangement by a sensor 350 and first and second transponders 351 and 352 at the first and second waveguide filter pairs $F_{1H}$, $F_{2H}$ or $F_{1L}$, $F_{2L}$ respectively.

Preferably, the sensor arrangement 350, 351 and 352 is further configured to indicate if the one of the first or the second waveguide filter pairs $F_{1H}$, $F_{2H}$ or $F_{1L}$, $F_{2L}$ that is engaged in the first and second waveguide conduits 121 and 122 is properly positioned therein.

Figure 4:
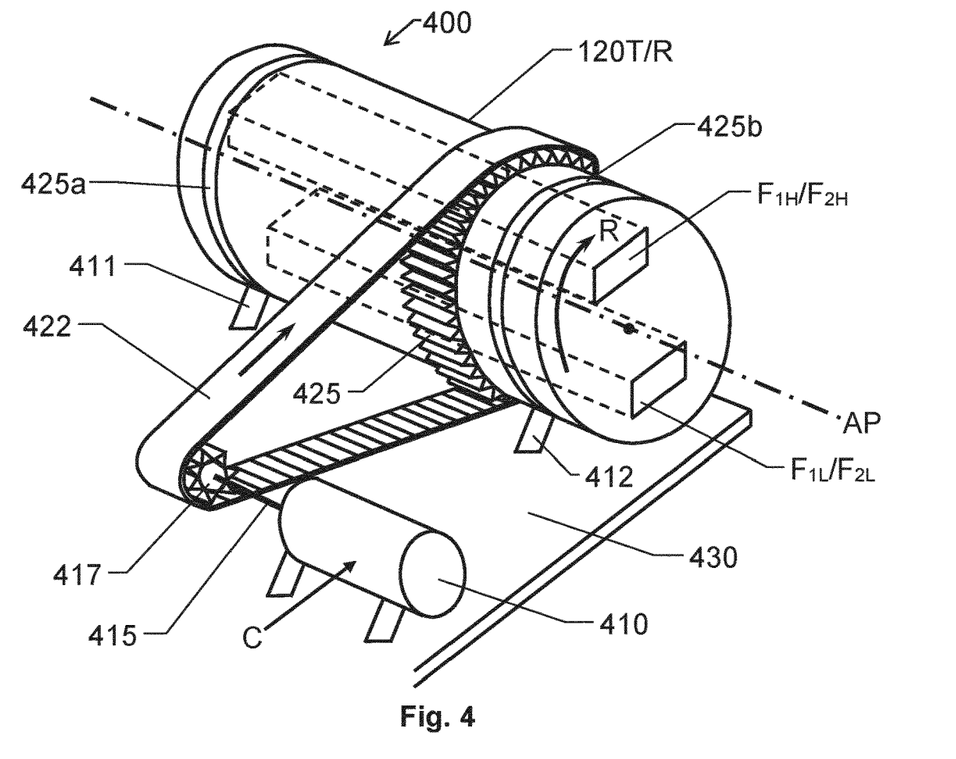
FIG. 4 illustrates a filter structure according to a second embodiment of the invention.

FIG. 4 illustrates a filter structure 400 according to a second embodiment of the invention. The filter structure 400 is carried in a frame being represented by two rings 425a and 425b respectively that are mounted on a flat surface 430 via schematic legs 411 and 412. In contrast to FIG. 3, here, a rotation axis AP around which the filter structure 400 is rotated a predetermined angle to either engage the first waveguide filter pair $F_{1H}$, $F_{2H}$ or the second waveguide filter pair $F_{1L}$, $F_{2L}$ in the first and second waveguide conduits 121 and 122, is parallel to the flat surface 430 onto which the frame 425a and 425b is mounted. However, analogous to the embodiment of FIG. 3, the predetermined angle is 180 degrees. This means that the first or the second waveguide filter pairs $F_{1H}$, $F_{2H}$ or $F_{1L}$, $F_{2L}$ are positioned back to back in the filter structure 400.

As mentioned above, the filter compartment 120T/R may be configured to be manually rotated R by a user of the terminal 100, be rotated by means of an electric motor, (or other type of automatically controllable actuator device) or a combination thereof. FIG. 4 exemplifies a motor 410 having a shaft 415 with a gear 417. A belt 422 embraces the gear 417 and a drive ring 425 of the filter compartment 120T/R. Consequently, in response to a control signal C received in the electric motor 410, the electric motor 410 may cause the filter compartment 120T/R to rotate R the predetermined angle.

Figure 5A:
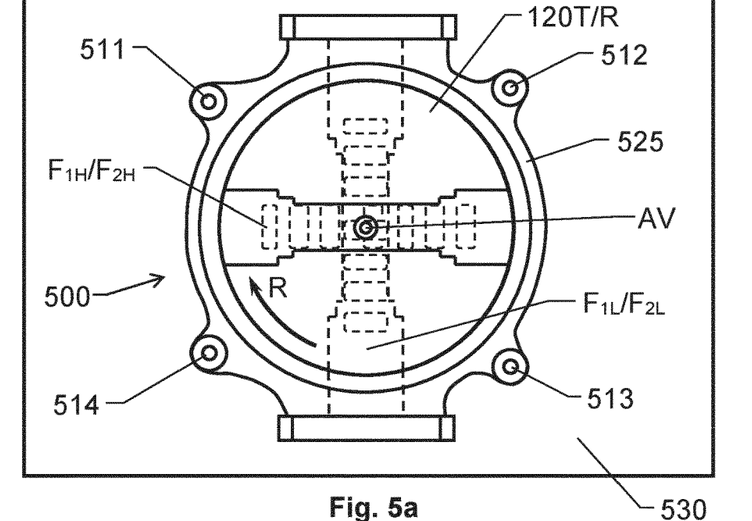
FIGS. 5a, b illustrate a filter structure according to a third embodiment of the invention.
Figure 5B:
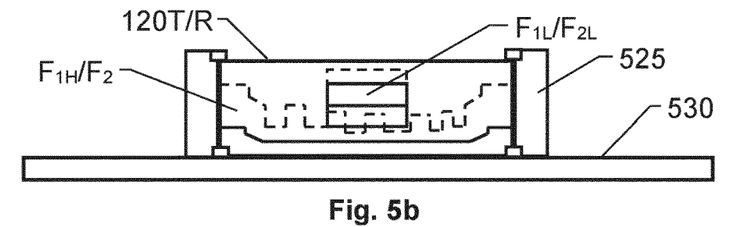

FIGS. 5a and 5b illustrate a filter structure 500 according to a third embodiment of the invention. As in FIG. 3, the filter structure 500 carries the filter compartment 120T/R in frame 525 that is mounted onto a flat surface 530, for example via attachment means 511, 512, 513 and 514, e.g. in the form of screws.

Similar to the embodiment of FIG. 3, the rotation axis AV is perpendicular to the flat surface 530.

Figure 6:
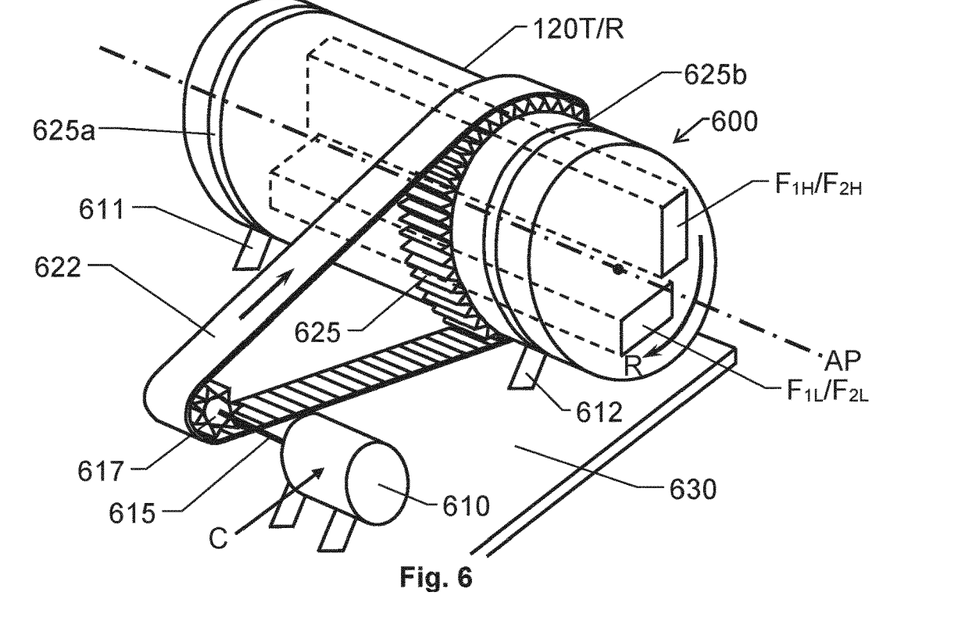
FIG. 6 illustrates a filter structure according to a fourth embodiment of the invention.

Here, however, the predetermined angle at which the filter compartment 120T/R is rotatable R around the rotation axis AV relative to the frame 525 so as to either engage the first waveguide filter pair $F_{1H}$, $F_{2H}$ or the second waveguide filter pair $F_{1L}$, $F_{2L}$ in the first and second waveguide conduits 121 and 122 is 90 degrees. Therefore, to attain a low overall profile of the filter structure 500, the first waveguide filter pair $F_{1H}$, $F_{2H}$ and the second waveguide filter pair $F_{1L}$, $F_{2L}$ are preferably interleaved on top of one another as illustrated in FIG. 5b FIG. 6 illustrates a filter structure 600 according to a fourth embodiment of the invention. Analogous to the second embodiment of FIG. 4, the filter structure 600 is carried in a frame represented by two rings 625a and 625b respectively that are mounted on a flat surface 630 via schematic legs 611 and 612; and the rotation axis AP is parallel to the flat surface 630. In contrast to FIG. 4 and similar to FIGS. 5a and 5b, the predetermined angle at which the filter compartment 120T/R is rotatable R around the rotation axis AP relative to the frame 625a and 625b so as to either engage the first waveguide filter pair $F_{1H}$, $F_{2H}$ or the second waveguide filter pair $F_{1L}$, $F_{2L}$ in the first and second waveguide conduits 121 and 122 is 90 degrees.

FIG. 6 further shows an electric motor 610 (which equally well may be represented by another type of automatically controllable actuator device) having a shaft 615 with a gear 617. A belt 622 embraces the gear 617 and a drive ring 625 of the filter compartment 120T/R. Consequently, in response to a control signal C received in the electric motor 610, the electric motor 610 may cause the filter compartment 120T/R to rotate R the predetermined angle. Alternatively, or additionally, the filter compartment 120T/R may rotated R manually by a user of the terminal 100.

FIGS. 4 to 6 exemplify embodiments of the invention, wherein the predetermined angle by which the filter compartment 120T/R is rotatable to either engage the first waveguide filter pair $F_{1H}$, $F_{2H}$ or the second waveguide filter pair $F_{1L}$, $F_{2L}$ in the first and second waveguide conduits 121 and 122 is either 90 or 180 degrees.

A predetermined rotation of 180 degrees is generally advantageous because it enables a slim design in relation to the flat surface, especially if the rotation axis is perpendicular to this surface. Namely, in such a case the first and second waveguide filters may be arranged side by side with a respective lowest side protruding from the flat surface.

A predetermined rotation of 90 degrees is generally advantageous because it requires less movement when switching bands. More important, however, a design involving 90 degrees rotation accomplishes a maximal distance between the engaged and non-engaged waveguide filters. This, in turn, vouches for small signal leakage via the non-engaged filter.

Although being generally less desirable than 90 and 180 degrees, according to the invention, it is technically possible to select any other predetermined angle that is large enough to accommodate the first and second waveguide filters in the filter compartment.

Figure 7:
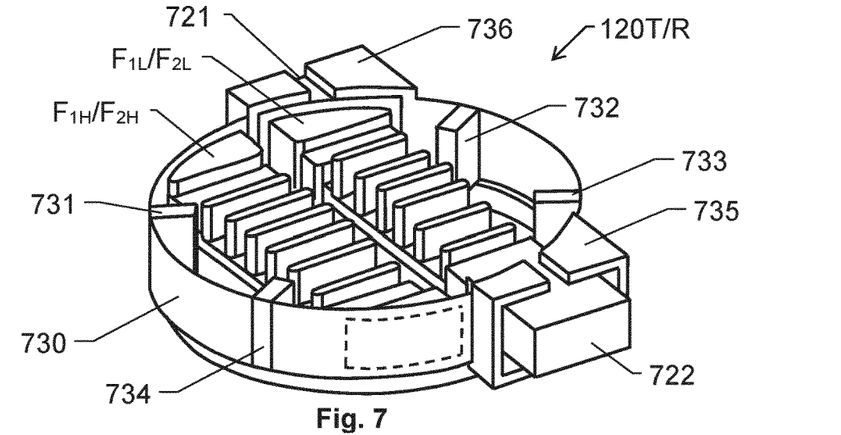
FIGS. 7, 8 illustrate various leakage reduction components according to embodiments of the invention.
Figure 8:
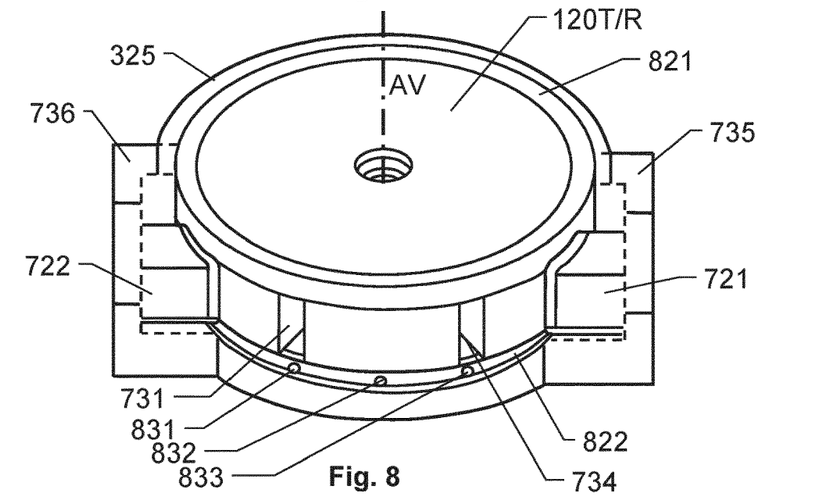
Figure 9:
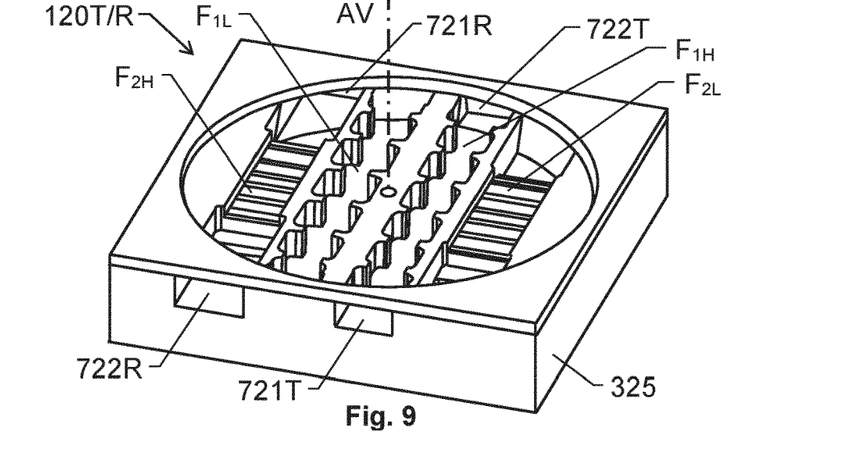
FIG. 9 illustrates a filter structure according to a fifth embodiment of the invention.

FIGS. 7 to 9 illustrate various leakage reduction components according to embodiments of the invention. It should be noted that the geometry shown in FIG. 7 represents volumes filled with air or other non-conducting material in the first and second waveguide conduits 121 and 122 respectively.

FIG. 7 represents a first waveguide filter $F_{1H}/F_{2H}$ and a second waveguide filter $F_{1L}/F_{2L}$ in a filter compartment 120T/R that is rotatable as described above with reference to FIG. 3. In FIG. 7, the filter compartment 120T/R has been positioned such that the second waveguide filter $F_{1L}/F_{2L}$, is engaged in a waveguide conduit. As a result, electromagnetic energy may pass from an input 721 to an output 722 of the filter structure.

Leakage reduction components in the form of a first waveguide choke 735 and a second waveguide choke 736 are here configured to screen off electromagnetic energy from the input 721 and the output 722 respectively.

FIG. 7 represents an air slot 730 between filter compartment 120T/R and the frame 325. To reduce signal leakage along the air slot 730, the air slot 730 should be narrow, say in the order of 50 μm (for the Ku band). It is further preferable if one or more stub elements are arranged in the outer wall of the filter compartment 120T/R. FIG. 7 shows four such stub elements in the form of openings 731, 732, 733 and 734. Each of these stub elements is configured to prevent leaking electromagnetic energy from propagating along the outer wall of the filter compartment 120T/R.

FIG. 8 shows a filter compartment 120T/R that is rotatable as described above with reference to FIG. 3. Rotation of the filter compartment 120T/R in the frame 325 is facilitated by means of first and second bearing rings 821 and 822 disposed around the filter compartment 120T/R. In FIG. 8 leakage reduction components are represented by a number of spring-assisted contact members, say 2-4, here represented by 831, 832 and 833 arranged in the first and/or the second bearing ring 822. Each of the contact members is configured to cause galvanic contact between the filter compartment 120T/R and the frame 325 thus shortcutting any leaking electromagnetic energy.

FIG. 9 illustrates a filter structure according to one embodiment of the invention, where the filter compartments 120T and 120R for transmission and reception respectively are combined and implemented parallel to one another in a single frame 325. Thus, when the combined filter compartment 120T/R is rotated 180 degrees, either a first filter pair $F_{1L}$ and $F_{2L}$ is simultaneously engaged in the first and second waveguide conduits 121 and 122 respectively, or a second filter pair $F_{1H}$ and $F_{2H}$ is simultaneously engaged in the first and second waveguide conduits 121 and 122 respectively.

More precisely, in a first positioning of the combined filter compartment 120T/R, the first filter pair $F_{1L}$ and $F_{2L}$ is set such that a first low-band filter component $F_{1L}$ is coupled between a transmitter input 721T and a transmitter output 722T in the frame 325 and a second low-band filter component $F_{2L}$ is coupled between a receiver input 721R and a receiver output 722R in the frame 325 (as illustrated in FIG. 9). Analogously, in a second positioning of the combined filter compartment 120T/R, the second filter pair $F_{1H}$ and $F_{2H}$ is set such that a first high-band filter component $F_{1H}$ is coupled between the transmitter input 721T and the transmitter output 722T and a second high-band filter component $F_{2H}$ is coupled between the receiver input 721R and the receiver output 722R.

Figure 10A:
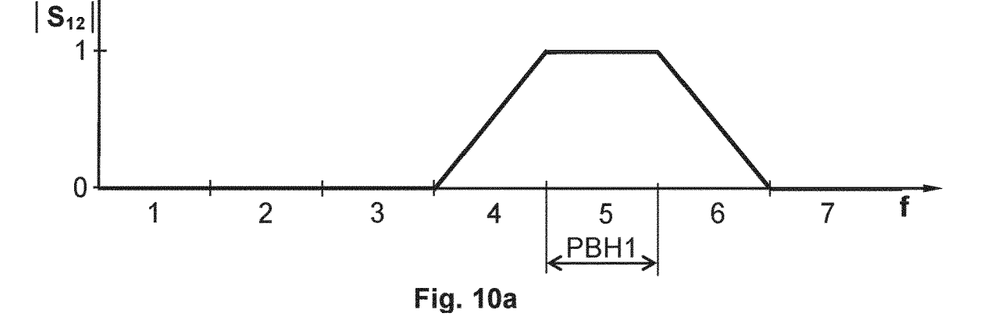
FIGS. 10a, 11a show frequency graphs illustrating a first combination of a receiver-transmitter pair of filters according to one embodiment of the invention.
Figure 11A:
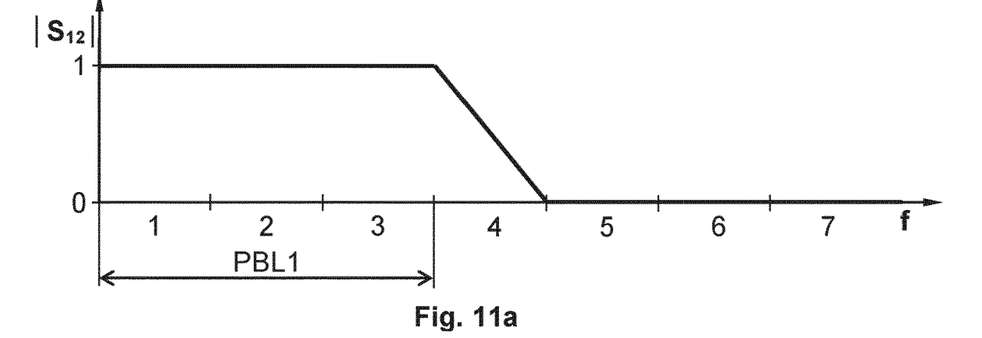

FIGS. 10*a* and 11*a* show frequency graphs illustrating a first combination of a receiver-transmitter pair of filters according to one embodiment of the invention. The graphs represent a symbolic signal gain$|S_{12}|$ in a linear scale from 0 to 1 along the vertical axes and frequency along the horizontal axes. As discussed above with reference to FIGS. 2*a* and 2*b*, the passbands PBH1 and PBL1 and stop bands are such that they may be used interchangeably for transmission and reception without risk of interference.

Figure 10B:
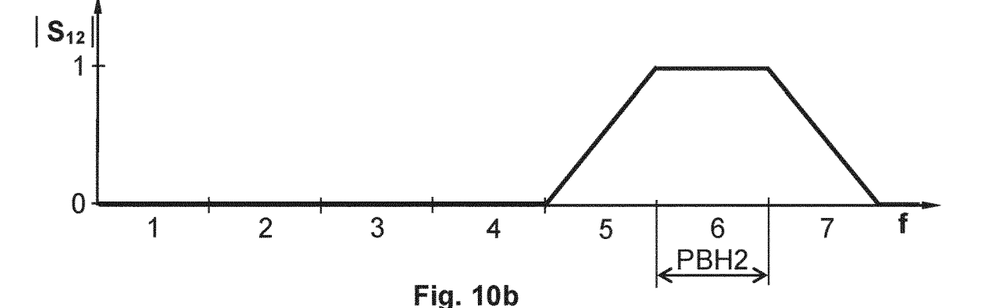
FIGS. 10b, 11b show frequency graphs illustrating a second combination of a receiver-transmitter pair of filters according to one embodiment of the invention.
Figure 11B:
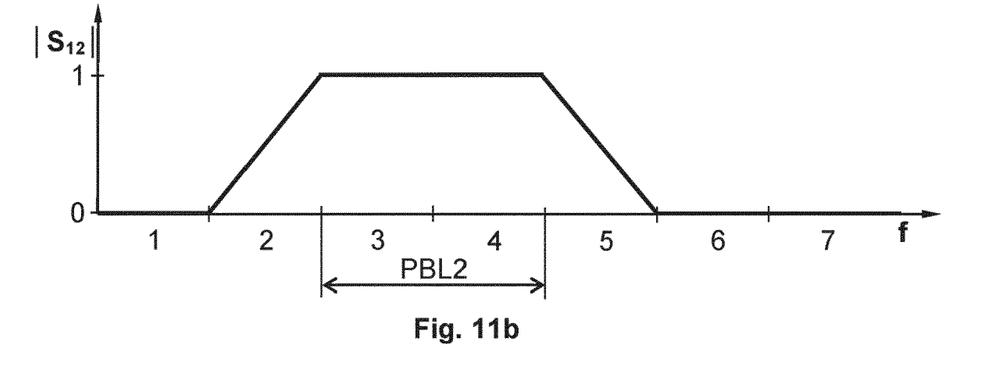

FIGS. 10*b* and 11*b* show frequency graphs illustrating a second combination of a receiver-transmitter pair of filters according to one embodiment of the invention. Also here, the graphs represent a symbolic signal gain$|S_{12}|$ in a linear scale from 0 to 1 along the vertical axes and frequency along the horizontal axes; and the passbands PBH2 and PBL2 and stop bands are such that they may be used interchangeably for transmission and reception without risk of interference.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the 10 word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A terminal for dual-band radio communication with spacecrafts, the terminal comprising:
   an antenna unit configured to exchange radio-frequency signals ($RF_R$; $RF_T$) bidirectionally with the spacecrafts;
   a first amplifying and frequency-mixing circuitry configured to up convert an outgoing modulated signal ($T_x$) to be fed through a first waveguide conduit connected to the antenna unit;
   a second amplifying and frequency-mixing circuitry configured to down convert an incoming signal ($R_W$) received through a second waveguide conduit connected to the antenna unit; and
   a modulator-demodulator unit configured to transform an outgoing baseband signal ($BB_T$) into the outgoing modulated signal ($T_x$) and transform the incoming signal ($R_W$) into a received baseband signal ($BB_R$),
   wherein each of the first and second waveguide conduits is arranged to forward radio-frequency signals on at least two separate bands ($F_{1H}$, $F_{1L}$; $F_{2H}$, $F_{2L}$),
   wherein the first and second waveguide conduits comprise a respective or a common filter compartment being rotatable a predetermined angle around a rotation axis (AV, AP) relative to a frame so as to either engage a first waveguide filter pair ($F_{1H}$, $F_{2H}$) or a second waveguide filter pair ($F_{1L}$, $F_{2L}$) in the first and second waveguide conduits, which first waveguide filter pair ($F_{1H}$, $F_{2H}$) is adapted for radio communication at a higher band than the second waveguide filter pair ($F_{1L}$, $F_{2L}$).

2. The terminal according to claim 1, wherein said filter compartment is rotatable 180 degrees around the rotation axis (AV, AP) relative to the frame.

3. The terminal according to claim 1, wherein said filter compartment is rotatable 90 degrees around the rotation axis (AV, AP) relative to the frame.

4. The terminal according to claim 1, wherein the rotation axis (AV) is perpendicular to a flat surface onto which the frame is mounted.

5. The terminal according to claim 1, wherein the rotation axis (AP) is parallel to a flat surface onto which the frame is mounted.

6. The terminal according to claim 1, wherein said filter compartment is configured to be manually rotated by a user of the terminal.

7. The terminal according to claim 1, comprising an automatically controllable actuator device configured to cause said filter compartment to rotate in response to a control signal.

8. The terminal according to claim 1, comprising a sensor arrangement configured to produce a signal indicating which of the first and second waveguide filter pairs ($F_{1H}$, $F_{2H}$; $F_{1L}$, $F_{2L}$) that is engaged in the first and second waveguide conduits.

9. The terminal according to claim 8, wherein the sensor arrangement is further configured to indicate if the one of the first or the second waveguide filter pairs ($F_{1H}$, $F_{2H}$; $F_{1L}$, $F_{2L}$) being engaged in the first and second waveguide conduits is properly positioned therein.

10. A filter structure for engaging selectively either a first waveguide filter ($F_{1H}$; $F_{2H}$) or a second wave-guide filter ($F_{1L}$; $F_{2L}$) in a waveguide conduit thus rendering the waveguide conduit adapted for forwarding radio-frequency signals at a higher band (PBH1; PBH2) or a lower band (PBL1; PBL2) respectively, characterized in that the filter structure comprises a frame carrying a filter compartment that holds the first and second waveguide filters ($F_{1H}$, $F_{2H}$; $F_{1L}$, $F_{2L}$), and the filter compartment is rotatable a predetermined angle around a rotation axis (AV, AP) relative to the frame so as to either engage the first waveguide filter ($F_{1H}$, $F_{2H}$) or the second waveguide filter ($F_{1L}$, $F_{2L}$) in the waveguide conduit.

11. The filter structure according to claim 10, comprising at least one leakage reduction component configured to reduce an outflow of signal energy outside of the first or second waveguide filter (F1H, F2H; F1L, F2L) respectively being engaged in the waveguide conduit.

12. The filter structure according to claim 11, wherein the at least one leakage reduction component comprises at least one of:
- at least one waveguide choke configured to screen off electromagnetic energy from an input to or an output from the filter structure;
- at least one stub element arranged in an outer wall of the filter compartment, which at least one stub element is configured to prevent leaking electromagnetic energy from propagating along said outer wall; and
- at least one spring-assisted contact member arranged in a bearing ring of the filter compartment, which at least one contact member is configured to cause galvanic contact between the filter compartment and the frame thus shortcutting any leaking electromagnetic energy.

* * * * *